United States Patent
Kubo et al.

(10) Patent No.: US 9,586,468 B2
(45) Date of Patent: Mar. 7, 2017

(54) HYBRID DRIVE DEVICE

(71) Applicant: AISIN AW CO., LTD., Anjo-shi, Aichi-ken (JP)

(72) Inventors: Rikiya Kubo, Anjo (JP); Katsutoshi Shimizu, Anjo (JP); Ryuta Horie, Anjo (JP); Masaki Yoshida, Anjo (JP); Yusuke Kojima, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/911,605

(22) PCT Filed: Sep. 25, 2014

(86) PCT No.: PCT/JP2014/075383
§ 371 (c)(1),
(2) Date: Feb. 11, 2016

(87) PCT Pub. No.: WO2015/046306
PCT Pub. Date: Apr. 2, 2015

(65) Prior Publication Data
US 2016/0185206 A1  Jun. 30, 2016

(30) Foreign Application Priority Data

Sep. 26, 2013 (JP) .................................. 2013-200374

(51) Int. Cl.
*F16H 3/72* (2006.01)
*B60K 6/48* (2007.10)
(Continued)

(52) U.S. Cl.
CPC .............. *B60K 6/48* (2013.01); *B60K 6/365* (2013.01); *B60K 6/40* (2013.01); *B60K 6/405* (2013.01);
(Continued)

(58) Field of Classification Search
CPC . B60K 6/48; B60K 6/365; B60K 6/40; B60K 6/445; B60K 6/547; F16H 57/021;
(Continued)

(56) References Cited

U.S. PATENT DOCUMENTS

| | | | |
|---|---|---|---|
| 2006/0166772 A1 | 7/2006 | Kano et al. | |
| 2009/0115263 A1* | 5/2009 | Ihara | B60K 6/26 310/96 |

(Continued)

FOREIGN PATENT DOCUMENTS

| | | | |
|---|---|---|---|
| JP | 2009-012693 A | 1/2009 | |
| JP | 2012-086827 A | 5/2012 | |

(Continued)

OTHER PUBLICATIONS

Jan. 6, 2015 Search Report issued in International Patent Application No. PCT/JP2014/075383.

*Primary Examiner* — David J Hlavka
(74) *Attorney, Agent, or Firm* — Oliff PLC (57) ABSTRACT

A hybrid drive device that includes an input member drivably coupled to an internal combustion engine; a speed change device; a rotary electric machine disposed side by side with the speed change device in an axial direction and including a rotary shaft coupled to an input shaft of the speed change device; a case that houses the rotary electric machine and the speed change device; an intermediate support member disposed between the rotary electric machine and the speed change device in the axial direction and configured to rotatably support the rotary shaft and the input shaft; and a fastening bolt that fixes the intermediate support member to the case.

20 Claims, 3 Drawing Sheets

(51) Int. Cl.

| | | |
|---|---|---|
| *B60K 6/40* | (2007.10) | |
| *B60K 6/405* | (2007.10) | |
| *B60K 6/445* | (2007.10) | |
| *B60K 6/547* | (2007.10) | |
| *B60L 11/14* | (2006.01) | |
| *F16H 57/021* | (2012.01) | |
| *F16H 57/031* | (2012.01) | |
| *B60L 11/12* | (2006.01) | |
| *B60L 15/20* | (2006.01) | |
| *B60K 6/365* | (2007.10) | |
| *F16H 57/02* | (2012.01) | |

(52) U.S. Cl.
CPC .............. *B60K 6/445* (2013.01); *B60K 6/547* (2013.01); *B60L 11/123* (2013.01); *B60L 11/14* (2013.01); *B60L 15/2054* (2013.01); *F16H 57/021* (2013.01); *F16H 57/031* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60Y 2200/92* (2013.01); *F16H 2057/0216* (2013.01); *F16H 2057/02034* (2013.01); *Y02T 10/6217* (2013.01); *Y02T 10/645* (2013.01); *Y02T 10/7077* (2013.01); *Y02T 10/72* (2013.01); *Y02T 10/7275* (2013.01); *Y10S 903/91* (2013.01); *Y10S 903/919* (2013.01); *Y10S 903/951* (2013.01)

(58) Field of Classification Search
CPC ......... F16H 57/031; F16H 2057/02034; F16H 2057/0216
See application file for complete search history.

(56) References Cited

U.S. PATENT DOCUMENTS

| | | | |
|---|---|---|---|
| 2009/0227416 A1* | 9/2009 | Kakinami | B60K 6/26 477/3 |
| 2009/0258747 A1 | 10/2009 | Iwase et al. | |
| 2009/0295242 A1* | 12/2009 | Yamamoto | B60K 6/365 310/83 |
| 2010/0069192 A1* | 3/2010 | Tabata | B60K 1/02 475/5 |
| 2012/0080248 A1 | 4/2012 | Kasuya et al. | |
| 2012/0080286 A1 | 4/2012 | Kasuya et al. | |
| 2012/0242199 A1* | 9/2012 | Iwase | B60K 6/40 310/68 B |
| 2013/0008274 A1 | 1/2013 | Mori et al. | |
| 2013/0213043 A1 | 8/2013 | Kasuya et al. | |
| 2013/0306423 A1* | 11/2013 | Ideshio | F16H 41/30 192/3.29 |
| 2014/0326105 A1* | 11/2014 | Kasuya | F16D 25/123 74/661 |

FOREIGN PATENT DOCUMENTS

| | | |
|---|---|---|
| JP | 2013-177116 A | 9/2013 |
| WO | 2005/000619 A1 | 1/2005 |
| WO | 2011/122385 A1 | 10/2011 |

* cited by examiner

|  | C1 | C2 | C3 | B1 | B2 | F1 |
|---|---|---|---|---|---|---|
| 1ST | ○ |  |  |  | (○) | △ |
| 2ND | ○ |  |  | ○ |  |  |
| 3RD | ○ | ○ |  |  |  |  |
| 4TH |  | ○ |  | ○ |  |  |
| REV |  |  | ○ |  | ○ |  |

HYBRID DRIVE DEVICE

BACKGROUND

The present disclosure relates to a hybrid drive device that includes an input member drivably coupled to an internal combustion engine, a speed change device, a rotary electric machine disposed side by side with the speed change device in the axial direction and including a rotary shaft coupled to an input shaft of the speed change device, a case that houses the rotary electric machine and the speed change device, an intermediate support member disposed between the rotary electric machine and the speed change device in the axial direction and configured to rotatably support the rotary shaft and the input shaft, and a fastening bolt that fixes the intermediate support member to the case.

A device described in Japanese Patent Application Publication No. 2009-12693 mentioned below is already known as an example of the hybrid drive device described above. In the technique according to Japanese Patent Application Publication No. 2009-12693, a fastening portion such as a fastening bolt that fixes an intermediate support member to a case is disposed on the radially outer side of a speed change device and on the side of the speed change device, in the axial direction, with respect to a coil end portion of a rotary electric machine.

SUMMARY

Because the intermediate support member supports the rotary shaft of the rotary electric machine and the input shaft of the speed change device which are each a power transfer shaft that drives the vehicle, the fastening portion which fixes the intermediate support member to the case is required to have a high strength, which increases the size of the fastening bolt and a boss portion for fixation of the fastening bolt.

In the technique according to Japanese Patent Application Publication No. 2009-12693, however, the fastening bolt is disposed on the radially outer side of the speed change device. Therefore, the outside diameter of the case is increased by an amount corresponding to the fastening bolt and the boss portion for fixation of the fastening bolt, which is restriction on reducing the size of the hybrid drive device.

In addition, the fastening bolt is disposed at a position at which the fastening bolt overlaps the coil end portion of the rotary electric machine, which projects in the axial direction, as seen in the axial direction. Therefore, it is difficult to secure a clearance in the axial direction for disposing the fastening portion, which leads to restriction when the speed change device is disposed or the length of the hybrid drive device increases in the axial direction in order to dispose the fastening portion.

In view of the foregoing problem, it is desirable to provide a hybrid drive device which allows the outside diameter of the case to be reduced and the axial length of the hybrid drive device to be shortened by improving how a fastening bolt that fixes an intermediate support member to a case is disposed.

The present disclosure according to an exemplary aspect provides a hybrid drive device that includes an input member drivably coupled to an internal combustion engine, a speed change device, a rotary electric machine disposed side by side with the speed change device in an axial direction and including a rotary shaft coupled to an input shaft of the speed change device, a case that houses the rotary electric machine and the speed change device, an intermediate support member disposed between the rotary electric machine and the speed change device in the axial direction and configured to rotatably support the rotary shaft and the input shaft, and a fastening bolt that fixes the intermediate support member to the case, wherein the rotary electric machine includes a stator disposed on a radially outer side of a rotor that rotates together with the rotary shaft, and the stator includes a coil end portion that projects in the axial direction from a stator core; the case includes a peripheral wall that covers outer peripheries of the rotary electric machine and the speed change device, and an intermediate wall provided between the rotary electric machine and the speed change device in the axial direction to extend from the peripheral wall to a location on a radially inner side of the coil end portion; the intermediate support member includes a bearing support portion that supports a bearing configured to rotatably support the rotary shaft and the input shaft, a boss portion in a tubular shape, and a flange portion that extends radially outward from the boss portion; an outer peripheral surface of the boss portion abuts against a radially inner end surface of the intermediate wall; the flange portion extends in a radial direction on a side of the rotary electric machine with respect to the intermediate wall in the axial direction, and an outer peripheral surface of the flange portion is disposed on a radially inner side of the coil end portion; and the fastening bolt is inserted into the flange portion and the intermediate wall from a side of the rotary electric machine in the axial direction, and a head portion of the fastening bolt is disposed at a position at which the head portion overlaps the coil end portion as seen in the radial direction.

The term "rotary electric machine" as used herein refers to any of a motor (electric motor), a generator (electric generator), and a motor generator that functions both as a motor and as a generator as necessary.

According to the characteristic configuration described above, the fastening bolt which fixes the intermediate support member to the case can be disposed on the radially inner side of a coil end of the rotary electric machine that projects in the axial direction, and can be disposed so as not to overlap the coil end as seen in the axial direction. Hence, a space on the radially inner side of the coil end portion can be effectively utilized to dispose the fastening bolt. The fastening bolt can be disposed not on the radially outer side of the speed change device, which reduces the outside diameter of the case. In addition, the head portion of the fastening bolt can be disposed so as not to overlap the coil end portion of the rotary electric machine as seen in the axial direction but so as to overlap the coil end portion as seen in the radial direction. Therefore, the length of the hybrid drive device in the axial direction can be shortened by an amount corresponding to the overlap between the head portion of the fastening bolt and the coil end portion. In addition, a space on the radially inner side of the coil end portion can be effectively utilized to increase the size of a fastening portion such as the fastening bolt, which secures the strength of the fastening portion.

Thus, it is possible to appropriately fix the intermediate support member, which supports the rotary shaft of the rotary electric machine and the input shaft of the speed change device, to the case while reducing the size of the hybrid drive device.

Preferably, the flange portion is disposed so as to overlap the coil end portion as seen in the radial direction.

With the configuration, a space on the radially inner side of the coil end portion can be effectively utilized to dispose the flange portion which is configured to fix the intermediate support member to the intermediate wall. Thus, the length of the hybrid drive device in the axial direction can be further shortened.

Preferably, the bearing, the bearing support portion, the head portion of the fastening bolt, and the coil end portion are disposed at positions at which they overlap each other as seen in the radial direction, and the bearing, the bearing support portion, the head portion of the fastening bolt, and the coil end portion are disposed in this order from the radially inner side.

With the configuration, a space on the radially inner side of the coil end portion can be effectively utilized to dispose a coupling mechanism between the case and the intermediate support member and a support mechanism for the rotary shaft of the rotary electric machine and the input shaft of the speed change device. Thus, the size of the hybrid drive device can be further easily reduced.

Preferably, a thrust bearing is provided between the boss portion and a rotary member of the speed change device in the axial direction; and the radially inner end surface of the intermediate wall includes a projecting surface portion that projects toward the speed change device, in the axial direction, with respect to a first axial surface which faces the side of the speed change device and which is a surface among axial end surfaces of the boss portion, and the thrust bearing abuts against the first axial surface in the axial direction and abuts against the projecting surface portion in the radial direction.

With the configuration, the first axial surface of the boss portion can support the rotary member of the speed change device in the axial direction via the thrust bearing. In addition, the projecting surface portion is provided on the radially inner end surface of the intermediate wall against which the outer peripheral surface of the boss portion abuts, and the thrust bearing abuts, on the radially outer side, against the projecting surface portion in the radial direction. Hence, the configuration of an abutment portion between the boss portion and the intermediate wall can be effectively utilized to restrict the position of the thrust bearing in the radial direction. This also makes it possible to reduce the size of the boss portion compared to a case where only the boss portion is provided with both surfaces for abutment with the thrust bearing in the radial direction and the axial direction. Hence, the flange portion and the fastening bolt can be easily disposed on the inner side of the coil end, which makes it possible to reduce the size of the hybrid drive device.

Preferably, the intermediate wall includes an intermediate wall oil passage that extends in the radial direction inside the intermediate wall and that opens in the radially inner end surface; the intermediate support member includes a support member oil passage that extends in the radial direction inside the boss portion and that opens in an outer peripheral surface of the boss portion to be connected to the intermediate wall oil passage; and working oil supplied from a hydraulic control device is supplied to the speed change device or the rotary electric machine via the intermediate wall oil passage and the support member oil passage.

Preferably, the rotary electric machine is a first rotary electric machine; the hybrid drive device further includes a second rotary electric machine and a differential gear device that includes three rotary elements; the input member, the second rotary electric machine, and the rotary shaft of the first rotary electric machine and the input shaft of the speed change device are coupled to different rotary elements of the differential gear device; and the intermediate wall and the intermediate support member, the first rotary electric machine, the differential gear device, and the second rotary electric machine are disposed in this order from a side of the speed change device in the axial direction.

The term "drivably coupled" as used herein refers to a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

In the hybrid drive device in which not only the first rotary electric machine and the speed change device but also the second rotary electric machine, the differential gear device, and the internal combustion engine are disposed coaxially with each other as in the configuration described above, it is important to shorten the length of the hybrid drive device in the axial direction and reduce the outside diameter of the hybrid drive device, and also to appropriately support the various shafts. Hence, it is increasingly important to appropriately fix the intermediate support member, which supports the rotary shaft of the rotary electric machine and the input shaft of the speed change device, to the case while reducing the size of the hybrid drive device as described above.

DETAILED DESCRIPTION OF EMBODIMENTS

Figure 1:
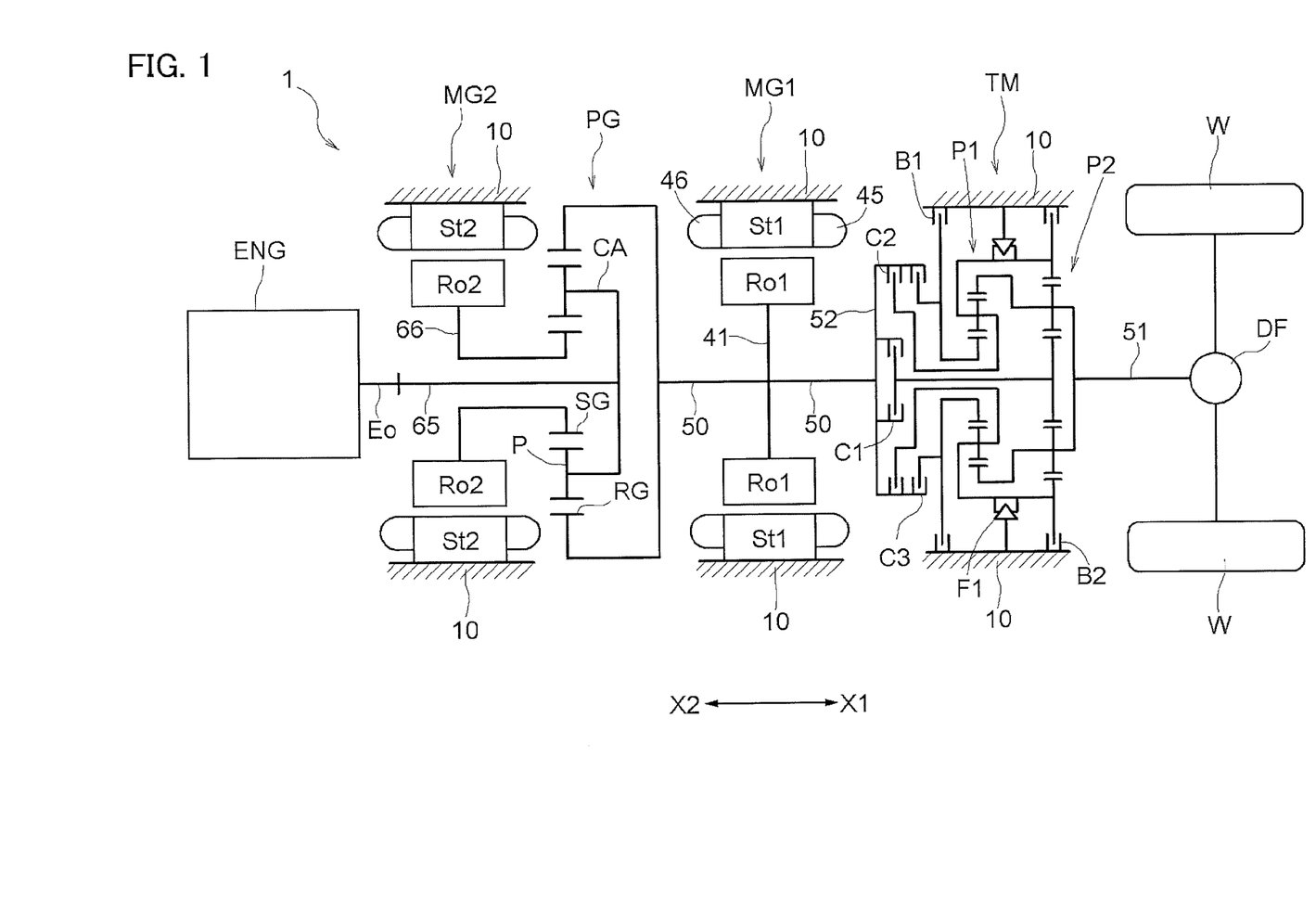
FIG. 1 is a skeleton diagram of a hybrid drive device according to an embodiment of the present disclosure.
Figure 2:
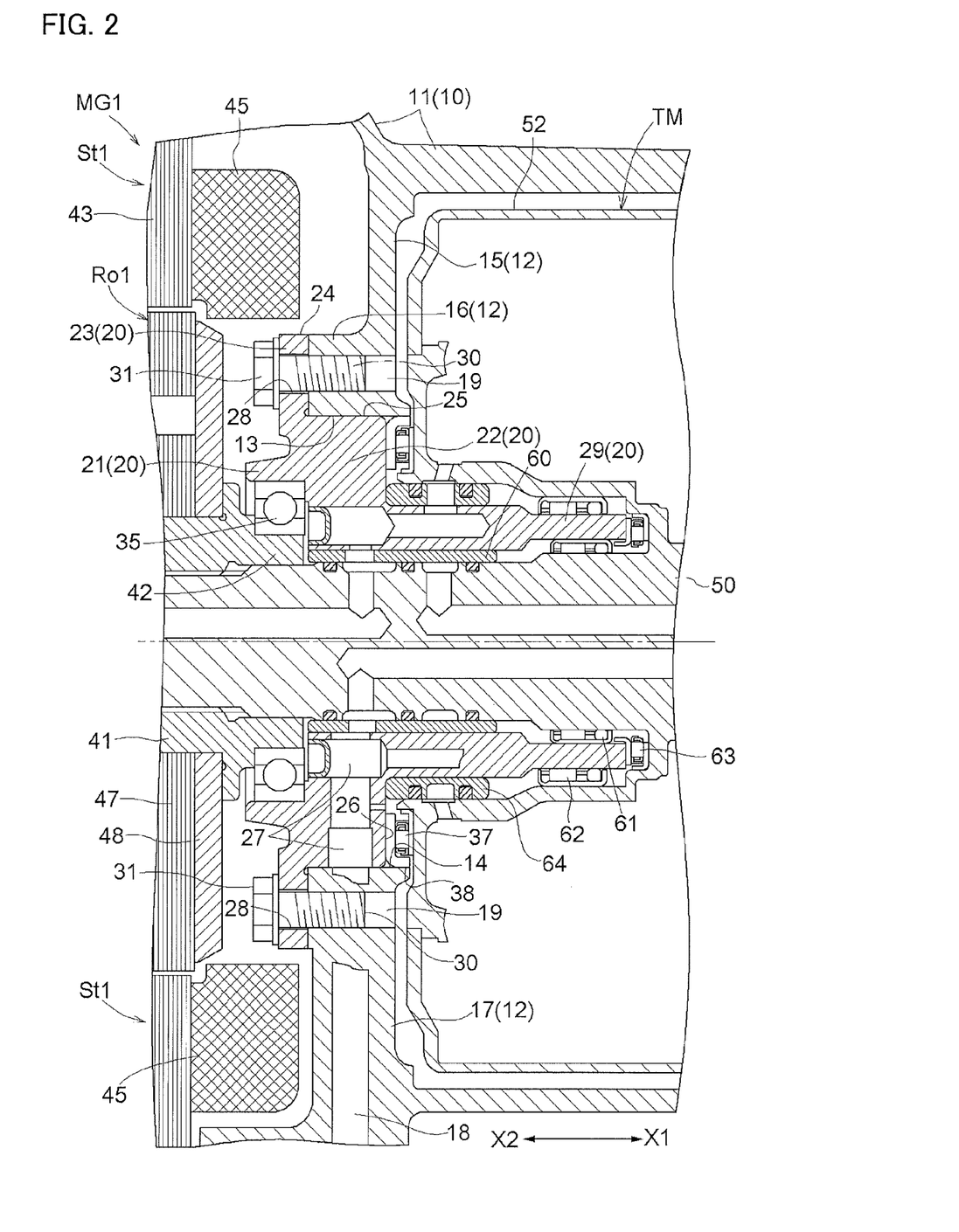
FIG. 2 is an axial sectional view of an essential portion of the hybrid drive device according to the embodiment of the present disclosure.

A hybrid drive device 1 according to an embodiment of the present disclosure will be described with reference to the drawings. FIG. 1 is a skeleton diagram of the hybrid drive device 1 according to the embodiment. FIG. 2 is an axial sectional view of an essential portion of the hybrid drive device 1 according to the embodiment.

The hybrid drive device 1 includes at least a speed change device TM, a first rotary electric machine MG1, and a case 10 that houses the first rotary electric machine MG1 and the speed change device TM. The speed change device TM and the first rotary electric machine MG1 are disposed side by side with each other in the axial direction. A first rotary shaft 41 of the first rotary electric machine MG1 is coupled to a transmission input shaft 50 of the speed change device TM.

The first rotary shaft 41 and the transmission input shaft 50 are disposed coaxially with each other. An axial direction from the first rotary electric machine MG1 toward the speed change device TM (toward the right side in FIGS. 1 and 2) is defined as a first axial direction X1. The opposite direction from the speed change device TM toward the first rotary electric machine MG1 (toward the left side in FIGS. 1 and 2) is defined as a second axial direction X2.

In such a configuration, the first rotary electric machine MG1 includes a stator St1 disposed on the radially outer side of a rotor Ro1 that rotates together with the first rotary shaft 41. The stator St1 includes a first coil end portion 45 that projects in the axial direction from a stator core 43.

As illustrated in FIG. 2, the hybrid drive device 1 includes an intermediate support member 20 disposed between the first rotary electric machine MG1 and the speed change device TM in the axial direction and configured to rotatably support the first rotary shaft 41 and the transmission input shaft 50, and a fastening bolt 30 that fixes the intermediate support member 20 to the case 10.

The case 10 includes a peripheral wall 11 that covers at least the outer peripheries of the first rotary electric machine MG1 and the speed change device TM, and an intermediate wall 12 that is provided between the first rotary electric machine MG1 and the speed change device TM in the axial direction and that extends from the peripheral wall 11 to a location on the radially inner side of the first coil end portion 45.

The intermediate support member 20 includes a bearing support portion 21 that supports a first bearing 35 configured to rotatably support the first rotary shaft 41 and the transmission input shaft 50, a support member boss portion 22 in a tubular shape, and a flange portion 23 that extends radially outward from the support member boss portion 22. An outer peripheral surface 25 of the support member boss portion 22 abuts against a radially inner end surface 13 of the intermediate wall 12. In addition, the flange portion 23 extends in the radial direction on the side of the first rotary electric machine MG1 (the side of the second axial direction X2) with respect to the intermediate wall 12 in the axial direction. An outer peripheral surface 24 of the flange portion 23 is disposed on the radially inner side of the first coil end portion 45.

The fastening bolt 30 is inserted into the flange portion 23 and the intermediate wall 12 from the side of the first rotary electric machine MG1 (the side of the second axial direction X2) in the axial direction. A head portion 31 of the fastening bolt 30 is disposed at a position at which the head portion 31 overlaps the first coil end portion 45 as seen in the radial direction.

The first rotary electric machine MG1 corresponds to the "rotary electric machine" according to the present disclosure. The first rotary shaft 41 corresponds to the "rotary shaft" according to the present disclosure. The transmission input shaft 50 corresponds to the "input shaft" according to the present disclosure. The support member boss portion 22 corresponds to the "boss portion" according to the present disclosure. The first coil end portion 45 corresponds to the "coil end portion" according to the present disclosure.

The hybrid drive device 1 according to the embodiment will be described in detail below.

1. Schematic Configuration of Hybrid Drive Device 1 and Internal Combustion Engine ENG In the embodiment, as illustrated in FIG. 1, the hybrid drive device 1 further includes an engine input shaft 65 that serves as an input member drivably coupled to an internal combustion engine ENG, a second rotary electric machine MG2, and a differential gear device PG that includes three rotary elements, in addition to the speed change device TM, the first rotary electric machine MG1, and the case 10. The engine input shaft 65, a second rotary shaft 66 of the second rotary electric machine MG2, and the first rotary shaft 41 of the first rotary electric machine MG1 and the transmission input shaft 50 of the speed change device TM are coupled to different rotary elements of the differential gear device PG.

The first rotary electric machine MG1, the differential gear device PG, and the second rotary electric machine MG2 are disposed coaxially with each other in this order from the side of the speed change device TM (the side of the first axial direction X1) in the axial direction. The intermediate wall 12 and the intermediate support member 20 are disposed between the first rotary electric machine MG1 and the speed change device TM in the axial direction (see FIG. 2).

<Internal Combustion Engine ENG>

The internal combustion engine ENG is a heat engine driven by combustion of fuel. Various internal combustion engines known in the art such as gasoline engines and diesel engines, for example, may be used as the internal combustion engine ENG. In the example, an internal combustion engine output shaft Eo, such as a crankshaft of the internal combustion engine ENG, is drivably coupled to the engine input shaft 65.

<First Rotary Electric Machine MG1>

The first rotary electric machine MG1 includes the stator St1 which is fixed to the case 10 which houses the hybrid drive device 1, and the rotor Ro1 which rotates together with the first rotary shaft 41 which is rotatably supported on the radially inner side of the stator St1. The first rotary shaft 41 is drivably coupled so as to rotate together with the transmission input shaft 50 of the speed change device TM and a ring gear RG of the planetary gear mechanism PG.

The first rotary electric machine MG1 is electrically connected to a battery that serves as an electricity accumulation device via an inverter that performs a DC/AC conversion. The first rotary electric machine MG1 can function as a motor (electric motor) that is supplied with electric power to produce power and as a generator (electric generator) that is supplied with power to produce electric power.

<Second Rotary Electric Machine MG2>

The second rotary electric machine MG2 includes a stator St2 fixed to the case 10 and a rotor Ro2 provided on the radially inner side of the stator St2 such that the rotor Ro2 rotates together with the second rotary shaft 66 which is rotatably supported. The second rotary shaft 66 is drivably coupled so as to rotate together with a sun gear SG of the planetary gear mechanism PG.

The second rotary electric machine MG2 is electrically connected to a battery that serves as an electricity accumulation device via an inverter that performs a DC/AC conversion. The second rotary electric machine MG2 can function as a motor (electric motor) that is supplied with electric power to produce power and as a generator (electric generator) that is supplied with power to produce electric power.

<Differential Gear Device PG>

The differential gear device PG is a single-pinion type planetary gear mechanism PG. That is, the planetary gear mechanism PG includes three rotary elements, namely a carrier CA that supports a plurality of pairs of pinion gears P, and the sun gear SG and the ring gear RG which each mesh with the pinion gears P. The carrier CA is coupled so as to rotate together with the engine input shaft 65. The sun gear SG is coupled so as to rotate together with the second rotary shaft 66 of the second rotary electric machine MG2. The ring gear RG is coupled so as to rotate together with the transmission input shaft 50 and the first rotary shaft 41 of the first rotary electric machine MG1.

<Speed Change Device TM>

The speed change device TM includes the transmission input shaft 50 which is drivably coupled to the side of a drive force source, a transmission output shaft 51 drivably coupled to wheels W, and a plurality of engagement devices C1, C2, . . . . A plurality of shift speeds are established in accordance with engagement or disengagement of the plurality of engagement devices C1, C2, . . . to transfer rotation of the transmission input shaft 50 to the transmission output shaft 51 with the speed of the rotation changed with the speed ratio of each shift speed and with torque converted. The transmission input shaft 50 is coupled so as to rotate together with the first rotary shaft 41 of the first rotary electric machine MG1 and the ring gear RG of the planetary gear mechanism PG. Torque transferred from the transmission input shaft 50 to the transmission output shaft 51 via the shift speed is distributed and transferred to two, left and right, axles via an output differential gear device DF to be transferred to the wheels W drivably coupled to the axles.

Figure 3:
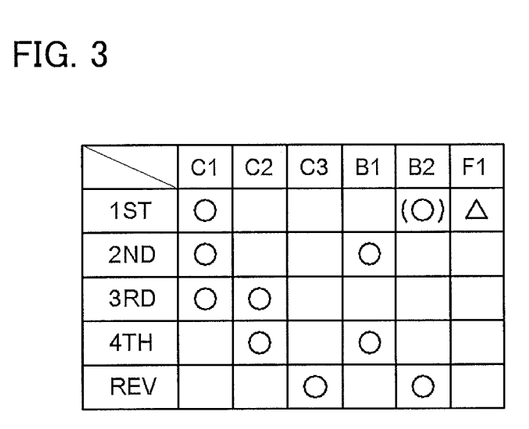
FIG. 3 is an operation table of a speed change device according to the embodiment of the present disclosure.

In the embodiment, as illustrated in the operation table of FIG. 3, the speed change device TM provides four shift speeds (a first speed 1ST, a second speed 2ND, a third speed 3RD, and a fourth speed 4TH) with different speed ratios (speed reduction ratios) as forward speeds. In order to establish the shift speeds, the speed change device TM includes gear mechanisms including a single-pinion type first planetary gear mechanism P1 and a second planetary gear mechanism P2, and six engagement devices C1, C2, C3, B1, B2, and F1, namely clutches and brakes. Switching is made among the four shift speeds by selectively engaging two of the plurality of engagement devices C1, C2, . . . by changing the rotational state of each rotary element of the first planetary gear mechanism P1 and the second planetary gear mechanism P2 by controlling engagement and disengagement of the plurality of engagement devices C1, C2, . . . excluding the one-way clutch F1. Besides the four shift speeds described above, the speed change device TM also provides one reverse speed REV.

In FIG. 3, the symbol "○" indicates that each engagement device is in the engaged state. The presence of "no symbol" indicates that each engagement device is in the disengaged state. The symbol "(○)" indicates that the engagement device is in the engaged state with engine braking in operation or the like. In addition, the symbol "Δ" indicates that the engagement device is in the disengaged state in the case where the engagement device rotates in one direction, and that the engagement device is in the engaged state in the case where the engagement device rotates in the other direction.

2. Detailed Configuration of Hybrid Drive Device 1

Next, the detailed configuration of the hybrid drive device 1 according to the embodiment will be described.

The speed change device TM, the first rotary electric machine MG1, the second rotary electric machine MG2, the planetary gear mechanism PG, and so forth, which compose the hybrid drive device 1, are housed in the case 10.

The case 10 includes the peripheral wall 11 which covers the outer peripheries of the speed change device TM, the first rotary electric machine MG1, the second rotary electric machine MG2, the planetary gear mechanism PG, and so forth. The peripheral wall 11 is formed in the shape of a tube that extends in the axial direction.

As illustrated in FIG. 2, the case 10 also includes the intermediate wall 12 which is provided between the first rotary electric machine MG1 and the speed change device TM in the axial direction and which extends from the peripheral wall 11 to a location on the radially inner side of the first coil end portion 45.

2-1. First Rotary Electric Machine MG1

The first rotary electric machine MG1 includes the stator St1 which is disposed on the radially outer side of the rotor Ro1 which rotates together with the first rotary shaft 41.

As illustrated in FIG. 2, the stator St1 of the first rotary electric machine MG1 includes the stator core 43 which is constituted by stacking a plurality of magnetic steel sheets in an annular plate shape in the axial direction and fixed to the peripheral wall 11, and a coil wound around the stator core 43.

The stator St1 includes coil end portions 45 and 46 that project in the axial direction from the stator core 43. The first coil end portion 45 projects in the first axial direction X1 from an axial end surface of the stator core 43, and the second coil end portion 46 projects in the second axial direction X2 from an axial end surface of the stator core 43 (see FIG. 1). The first coil end portion 45 corresponds to the "coil end portion" according to the present disclosure.

The rotor Ro1 includes a rotor core 47 constituted by stacking a plurality of magnetic steel sheets in an annular plate shape in the axial direction. The axial length of the rotor core 47 is equivalent to the axial length of the stator core 43. The rotor core 47 and the stator core 43 are disposed so as to overlap each other as seen in the radial direction. Therefore, the axial end surface of the rotor core 47 and the axial end surface of the stator core 43 are flush with each other in axial position.

The first rotary shaft 41 is formed in a cylindrical shape. The inner peripheral surface of the rotor core 47 is fitted with the outer peripheral surface of the first rotary shaft 41 to be fixed so as to rotate together therewith. End plates 48 that interpose the rotor core 47 from both sides in the axial direction are provided on both sides of the rotor core 47 in the axial direction.

The first rotary shaft 41 is coupled so as to rotate together with the transmission input shaft 50. In the embodiment, the inner peripheral surface of the first rotary shaft 41 is spline-fitted with the outer peripheral surface of the transmission input shaft 50 to be coupled so as to rotate together therewith. The transmission input shaft 50 extends in the second axial direction X2 with respect to a body portion of the speed change device TM, which is composed of the engagement devices and the gear mechanisms, to the planetary gear mechanism PG.

A cylindrical space is present on the radially inner side of the first coil end portion 45 and on the radially outer side of the transmission input shaft 50. The cylindrical space is effectively utilized to dispose an axially projecting portion 42 of the first rotary shaft 41, the first bearing 35, the bearing support portion 21 and the flange portion 23 of the intermediate support member 20, the head portion 31 of the fastening bolt 30, and so forth as described below.

The first rotary shaft 41 is supported so as to be rotatable with respect to the case 10 (intermediate support member 20) via the first bearing 35 on the side of the first axial direction X1. The transmission input shaft 50 is supported so as to be rotatable with respect to the case 10 (intermediate support member 20) via the first rotary shaft 41 and the first bearing 35.

The first rotary shaft 41 includes the axially projecting portion 42 which projects in the first axial direction X1 with respect to the rotor core 47. In the illustrated example, the length of projection of the axially projecting portion 42, which projects in the first axial direction X1 with respect to the rotor core 47 and the stator core 43, is equivalent to the length of projection of the first coil end portion 45, which projects in the first axial direction X1 with respect to the rotor core 47 and the stator core 43. Therefore, the axially projecting portion 42 of the first rotary shaft 41 is disposed on the radially inner side of the first coil end portion 45 and at a position at which the axially projecting portion 42 overlaps the first coil end portion 45 as seen in the radial direction.

The axially projecting portion 42 is formed in a cylindrical shape. The inner peripheral surface of the first bearing 35 in a cylindrical shape is fitted with the outer peripheral surface of the axially projecting portion 42. The outer peripheral surface of the first bearing 35 is fitted with the inner peripheral surface of the bearing support portion 21 of the intermediate support member 20.

2-2. Intermediate Wall 12

As illustrated in FIG. 2, the case 10 includes the intermediate wall 12 which is provided between the first rotary electric machine MG1 and the speed change device TM in the axial direction and which extends from the peripheral wall 11 to a location on the radially inner side of the first coil end portion 45. The intermediate wall 12 is generally an annular member that extends in the radial direction and the circumferential direction. The intermediate wall 12 is formed integrally with the peripheral wall 11.

The intermediate wall 12 includes a radially extending portion 15 in an annular plate shape that extends in the radial direction from the peripheral wall 11 to a radial position slightly on the radially inner side of the first coil end portion 45 and that extends in the circumferential direction. The clearance, in the axial direction, between the radially extending portion 15 and the first coil end portion 45 is wider than the clearance, in the axial direction, between the radially extending portion 15 and the speed change device TM (rotary member 52).

In addition, the intermediate wall 12 is formed to extend, from the radially extending portion 15, in the radial direction, to a radial position on the radially inner side of the first coil end portion 45, and in the circumferential direction. The intermediate wall 12 also includes an intermediate wall boss portion 16 in a cylindrical shape provided at an end portion on the radially inner side to extend in the axial direction in order to form a coupling portion with the intermediate support member 20.

The intermediate wall boss portion 16 extends in the second axial direction X2 with respect to the radially extending portion 15, and is disposed such that an end surface of the intermediate wall boss portion 16 on the side of the second axial direction X2 and an end surface of the stator core 43 on the side of the first axial direction X1 are proximate to each other in the axial direction.

The radially inner end surface 13 of the intermediate wall boss portion 16 (intermediate wall 12) coincides with the radial position of an intermediate portion, in the radial direction, of the ring of the rotor core 47.

Hence, the intermediate wall boss portion 16 is disposed between a radial position slightly on the radially inner side of the first coil end portion 45 and the radial position of the intermediate portion of the rotor core 47, and disposed on the radially inner side of the first coil end portion 45. In this way, the intermediate wall 12 extends radially inward of the first coil end portion 45 by an amount corresponding to the intermediate wall boss portion 16.

The intermediate wall boss portion 16 is provided with a bolt insertion hole 19 that is provided with a female thread and that extends in the axial direction. The fastening bolt 30 is screwed into the bolt insertion hole 19. A plurality of bolt insertion holes 19 are provided at different positions in the circumferential direction.

In addition, an oil passage (hereinafter referred to as an intermediate wall oil passage 18) is formed inside the intermediate wall 12. The intermediate wall oil passage 18 is configured to supply working oil, which has been supplied from a hydraulic control device disposed vertically below the hybrid drive device 1, to various constituent elements of the hybrid drive device 1 such as the speed change device TM and the first rotary electric machine MG1. The intermediate wall oil passage 18 is formed in an oil passage forming portion 17 of the intermediate wall 12. Here, the oil passage forming portion 17 is a protrusion portion that swells in the second axial direction X2 from the wall surface of the intermediate wall 12 and that extends in the radial direction.

The oil passage forming portion 17 extends in the radial direction, and also extends in the axial direction in order to form the intermediate wall oil passage 18 therein. The intermediate wall 12 includes a plurality of oil passage forming portions 17 that extend in the radial direction at different positions in the circumferential direction. The intermediate wall oil passage 18 extends in the radial direction, and opens in the radially inner end surface 13 of the intermediate wall 12 to be connected to a support member oil passage 27 formed in the intermediate support member 20 which abuts against the radially inner end surface 13. In FIG. 2, one of the oil passage forming portions 17 and one of the intermediate wall oil passages 18 are illustrated.

2-3. Intermediate Support Member 20

The intermediate support member 20 includes the bearing support portion 21 which supports the first bearing 35 which is configured to rotatably support the first rotary shaft 41 and the transmission input shaft 50, the support member boss portion 22 in a tubular shape, and the flange portion 23 which extends radially outward from the support member boss portion 22.

<Support Member Boss Portion 22>

The support member boss portion 22 is formed in a cylindrical shape. The support member boss portion 22 is disposed on the radially inner side of the intermediate wall boss portion 16 and at a position at which the support member boss portion 22 overlaps the intermediate wall boss portion 16 as seen in the radial direction. The outer peripheral surface 25 of the support member boss portion 22 abuts against the radially inner end surface 13 (the inner peripheral surface 13 of the intermediate wall boss portion 16) of the intermediate wall 12.

The support member boss portion 22 extends in the radial direction from the radial position of the inner peripheral surface 13 of the intermediate wall boss portion 16 to the radial position of the outer peripheral surface of the transmission input shaft 50.

<Bearing Support Portion 21>

The bearing support portion 21 is a member in a cylindrical shape that projects in the second axial direction X2 from the support member boss portion 22. The bearing support portion 21 is disposed on the radially inner side of the first coil end portion 45 and at a position at which the bearing support portion 21 overlaps the first coil end portion 45 as seen in the radial direction. The inner peripheral surface of the bearing support portion 21 is fitted with the outer peripheral surface of the first bearing 35. In addition, an end surface of the first bearing 35 on the side of the first axial direction X1 abuts against a surface of the support member boss portion 22 that faces the side of the second axial direction X2.

<Flange Portion 23>

The flange portion 23 extends in the radial direction on the side of the first rotary electric machine MG1 (the side of the second axial direction X2) with respect to the intermediate wall 12 in the axial direction. The outer peripheral surface 24 of the flange portion 23 is disposed on the radially inner side of the first coil end portion 45.

The flange portion 23 is a member in an annular plate shape that extends in the second axial direction X2 from a radially outer end portion of the support member boss portion 22 and that thereafter extends radially outward of the support member boss portion 22. A surface of the flange portion 23 (annular plate portion) that faces the side of the first axial direction X1 abuts against an end surface of the intermediate wall boss portion 16 on the side of the second axial direction X2. The flange portion 23 is disposed on the radially inner side of the first coil end portion 45 and at a position at which the flange portion 23 overlaps the first coil end portion 45 as seen in the radial direction.

<Fastening Bolt 30>

The flange portion 23 is provided with a bolt through hole 28 which extends in the axial direction and into which a fastening bolt is inserted. A plurality of bolt through holes 28 are provided at different positions in the circumferential direction in correspondence with the bolt insertion holes 19 formed in the intermediate wall 12.

The fastening bolt 30 is inserted and screwed into the bolt through hole 28 of the flange portion 23 and the bolt insertion hole 19 of the intermediate wall 12 in the axial direction from the side of the first rotary electric machine MG1 (the side of the second axial direction X2) to fix the flange portion 23 to the intermediate wall 12.

The head portion 31 of the fastening bolt 30 abuts against a surface of the flange portion 23 that faces the side of the second axial direction X2. The head portion 31 of the fastening bolt 30 is disposed on the radially inner side of the first coil end portion 45 and at a position at which the head portion 31 overlaps the first coil end portion 45 as seen in the radial direction.

As described above, the first bearing 35, the bearing support portion 21, the head portion 31 of the fastening bolt, and the first coil end portion 45 are disposed at positions at which they overlap each other as seen in the radial direction, and the first bearing 35, the bearing support portion 21, the head portion 31 of the fastening bolt, and the first coil end portion 45 are disposed in this order from the radially inner side. Hence, a space on the radially inner side of the first coil end portion 45 can be effectively utilized to dispose a coupling portion between the case 10 and the intermediate support member 20 and a support mechanism for the first rotary shaft 41 and the transmission input shaft 50.

<Support Member Oil Passage 27>

An oil passage (hereinafter referred to as a support member oil passage 27) is formed inside the intermediate support member 20. The support member oil passage 27 is configured to supply working oil supplied from a hydraulic control device. The support member oil passage 27 extends in the radial direction in the intermediate wall boss portion 16, and opens in the outer peripheral surface 25 of the support member boss portion 22 to be connected to the intermediate wall oil passage 18 formed in the intermediate wall 12 which abuts against the outer peripheral surface 25. A plurality of support member oil passages 27 are formed at different positions in the circumferential direction. The support member oil passage 27 is also formed in an axially projecting portion 29 to be discussed later.

<Axially Projecting Portion 29>

The intermediate support member 20 includes the axially projecting portion 29 in a cylindrical shape which extends in the first axial direction X1 from a radially inner end portion of the support member boss portion 22.

The axially projecting portion 29 is inserted into a space in a cylindrical shape formed between the outer peripheral surface of the transmission input shaft 50 and the inner peripheral surface of the body portion of the speed change device TM from the side of the second axial direction X2.

The body portion of the speed change device TM is disposed with a clearance on the radially outer side from the outer peripheral surface of the transmission input shaft 50.

The inner peripheral surface of the axially projecting portion 29 rotatably supports the outer peripheral surface of the transmission input shaft 50 via a bearing 61. The outer peripheral surface of the axially projecting portion 29 rotatably supports the body portion of the speed change device TM via a bearing 62. An end surface of the axially projecting portion 29 on the side of the first axial direction X1 supports a flange portion of the transmission input shaft 50 via a bearing 63 in the axial direction.

A member of the body portion of the speed change device TM supported by the bearing 62 is a rotary member 52 that rotates about an axis. In the embodiment, as described in FIG. 1, the rotary member 52 is a member coupled to one of the engaging members of the first clutch C1, the second clutch C2, and the third clutch C3 so as to rotate together therewith, and coupled to the transmission input shaft 50 so as to rotate together therewith.

Although not illustrated in FIG. 2, the first clutch C1, the second clutch C2, and the third clutch C3 are disposed inside the rotary member 52, and an oil passage for working oil to be supplied to each clutch is formed in the axially projecting portion 29.

The support member oil passage 27 which extends in the axial direction is formed inside the axially projecting portion 29. The axially projecting portion 29 is provided with a through hole that extends from the support member oil passage 27 to open in the outer peripheral surface of the axially projecting portion 29 so that working oil is supplied to each clutch. The axially projecting portion 29 and the support member boss portion 22 are provided with a through hole that extends from the support member oil passage 27 to open in the inner peripheral surfaces of the axially projecting portion 29 and the support member boss portion 22 so that working oil is supplied to an oil passage formed in the transmission input shaft 50. The working oil is supplied to various portions of the hybrid drive device 1 such as other clutches and brakes of the speed change device TM, the first rotary electric machine MG1, and so forth via the oil passage in the transmission input shaft 50.

A sleeve member 64 in a cylindrical shape is disposed between the outer peripheral surface of the axially projecting portion 29 and the inner peripheral surface of the rotary member 52. The sleeve member 64 is used as an oil seal for the gap, and forms an oil passage. A sleeve member 60 in a cylindrical shape is disposed between the inner peripheral surfaces of the axially projecting portion 29 and the support member boss portion 22 and the outer peripheral surface of the transmission input shaft 50. The sleeve member 60 is used as an oil seal for the gap, and forms an oil passage.

<Thrust Bearing 37>

A thrust bearing 37 is provided between the support member boss portion 22 and the rotary member 52 of the speed change device TM in the axial direction.

The thrust bearing 37 abuts against a first axial surface 26, which is a surface of the support member boss portion 22 and which faces the side of the first axial direction X1, in the axial direction on the side of the second axial direction X2, and abuts against the rotary member 52 in the axial direction on the side of the first axial direction X1. The first axial surface 26 of the support member boss portion 22 that faces the side of the first axial direction X1 supports the rotary member 52 of the speed change device TM in the axial direction via the thrust bearing 37.

The radially inner end surface 13 of the intermediate wall 12 includes a projecting surface portion 14 that projects toward the speed change device TM (the side of the first axial direction X1) in the axial direction with respect to the first axial surface 26 which faces the side of the first axial direction X1 and which is a surface on the side of the speed change device TM among axial end surfaces of the support member boss portion 22. The amount of projection of the projecting surface portion 14 in the axial direction is equivalent to the thickness, in the axial direction, of a rotary body of the thrust bearing 37 on the side of the support member boss portion 22. The thrust bearing 37 abuts against the projecting surface portion 14 from the radially inner side. Hence, the position of the thrust bearing 37 in the radial direction is restricted by the projecting surface portion 14. In addition, the thrust bearing 37 abuts against the axially projecting portion of the rotary member 52 from the radially outer side. The projecting surface portion 14 is the same cylindrical surface as the radially inner end surface 13.

OTHER EMBODIMENTS

Lastly, other embodiments of the present disclosure will be described. The configuration of each embodiment described below is not limited to being applied in an individual manner, and may be applied in combination with the configuration of other embodiments unless any contradiction occurs.

(1) In the embodiment described above, the speed change device TM is a stepped automatic transmission that includes the plurality of engagement devices C1, C2, . . . and that selectively establishes one of a plurality of shift speeds in accordance with the state of engagement of the plurality of engagement devices. However, embodiments of the present disclosure are not limited thereto. That is, the speed change device TM may be any type of transmission such as a continuously variable transmission that transfers rotation of the transmission input shaft 50 to the transmission output shaft 51 with the speed of the rotation changed.

(2) In the embodiment described above, the speed change device TM includes the single-pinion type first planetary gear mechanism P1 and the second planetary gear mechanism P2, and the six engagement devices C1, C2, C3, B1, B2, and F1, and provides four forward shift speeds. However, embodiments of the present disclosure are not limited thereto. That is, the speed change device TM may include a desired number of a desired type of gear mechanisms such as double-pinion type planetary gear mechanisms, and a desired number of engagement devices, and may provide a desired number of shift speeds.

(3) In the embodiment described above, the hybrid drive device 1 further includes the engine input shaft 65 which is drivably coupled to the internal combustion engine ENG, the second rotary electric machine MG2, and the differential gear device PG in addition to the first rotary electric machine MG1 and the speed change device TM. However, embodiments of the present disclosure are not limited thereto. That is, the hybrid drive device 1 may include, as a power transfer device, at least the first rotary electric machine MG1 and the speed change device TM, and may not include the second rotary electric machine MG2, the differential gear device PG, or the like.

(4) In the embodiment described above, the flange portion 23 is disposed at a position at which the flange portion 23 overlaps the first coil end portion 45 as seen in the radial direction. However, embodiments of the present disclosure are not limited thereto. That is, the flange portion 23 may be disposed at a radial position on the radially inner side of the first coil end portion 45, but disposed at an axial position on the side of the first axial direction X1 with respect to the first coil end portion 45, so as to be disposed at a position at which the flange portion 23 does not overlap the first coil end portion 45 as seen in the radial direction. Also in this case, the head portion 31 of the fastening bolt 30 is disposed at a position at which the head portion 31 overlaps the first coil end portion 45 as seen in the radial direction.

INDUSTRIAL APPLICABILITY

The present disclosure may be suitably applied to a hybrid drive device that includes an input member drivably coupled to an internal combustion engine, a speed change device, a rotary electric machine disposed side by side with the speed change device in an axial direction and including a rotary shaft coupled to an input shaft of the speed change device, a case that houses the rotary electric machine and the speed change device, an intermediate support member disposed between the rotary electric machine and the speed change device in the axial direction and configured to rotatably support the rotary shaft and the input shaft, and a fastening bolt that fixes the intermediate support member to the case.

The invention claimed is:
1. A hybrid drive device comprising:
an input member drivably coupled to an internal combustion engine;
a speed change device;
a rotary electric machine disposed side by side with the speed change device in an axial direction and including a rotary shaft coupled to an input shaft of the speed change device;
a case that houses the rotary electric machine and the speed change device;
an intermediate support member disposed between the rotary electric machine and the speed change device in the axial direction and configured to rotatably support the rotary shaft and the input shaft; and
a fastening bolt that fixes the intermediate support member to the case, wherein:
the rotary electric machine includes a stator disposed on a radially outer side of a rotor that rotates together with the rotary shaft, and the stator includes a coil end portion that projects in the axial direction from a stator core;
the case includes a peripheral wall that covers outer peripheries of the rotary electric machine and the speed change device, and an intermediate wall provided between the rotary electric machine and the speed change device in the axial direction to extend from the peripheral wall to a location on a radially inner side of the coil end portion;
the intermediate support member includes a bearing support portion that supports a bearing configured to rotatably support the rotary shaft and the input shaft, a boss portion in a tubular shape, and a flange portion that extends radially outward from the boss portion;
an outer peripheral surface of the boss portion abuts against a radially inner end surface of the intermediate wall;

the flange portion extends in a radial direction on a side of the rotary electric machine with respect to the intermediate wall in the axial direction, and an outer peripheral surface of the flange portion is disposed on a radially inner side of the coil end portion; and the fastening bolt is inserted into the flange portion and the intermediate wall from a side of the rotary electric machine in the axial direction, and a head portion of the fastening bolt is disposed at a position at which the head portion overlaps the coil end portion as seen in the radial direction.

2. The hybrid drive device according to claim 1, wherein the flange portion is disposed so as to overlap the coil end portion as seen in the radial direction.

3. The hybrid drive device according to claim 2, wherein the bearing, the bearing support portion, the head portion of the fastening bolt, and the coil end portion are disposed at positions at which they overlap each other as seen in the radial direction, and the bearing, the bearing support portion, the head portion of the fastening bolt, and the coil end portion are disposed in this order from the radially inner side.

4. The hybrid drive device according to claim 3, wherein:
a thrust bearing is provided between the boss portion and a rotary member of the speed change device in the axial direction; and
the radially inner end surface of the intermediate wall includes a projecting surface portion that projects toward the speed change device, in the axial direction, with respect to a first axial surface which faces a side of the speed change device and which is a surface among axial end surfaces of the boss portion, and the thrust bearing abuts against the first axial surface in the axial direction and abuts against the projecting surface in the radial direction.

5. The hybrid drive device according to claim 4, wherein:
the intermediate wall includes an intermediate wall oil passage that extends in the radial direction inside the intermediate wall and that opens in the radially inner end surface;
the intermediate support member includes a support member oil passage that extends in the radial direction inside the boss portion and that opens in an outer peripheral surface of the boss portion to be connected to the intermediate wall oil passage; and
working oil supplied from a hydraulic control device is supplied to the speed change device or the rotary electric machine via the intermediate wall oil passage and the support member oil passage.

6. The hybrid drive device according to claim 5, wherein:
the rotary electric machine is a first rotary electric machine;
the hybrid drive device further includes a second rotary electric machine and a differential gear device that includes three rotary elements;
the input member, the second rotary electric machine, and the rotary shaft of the first rotary electric machine and the input shaft of the speed change device are coupled to different rotary elements of the differential gear device; and
the intermediate wall and the intermediate support member, the first rotary electric machine, the differential gear device, and the second rotary electric machine are disposed in this order from a side of the speed change device in the axial direction.

7. The hybrid drive device according to claim 1, wherein the bearing, the bearing support portion, the head portion of the fastening bolt, and the coil end portion are disposed at positions at which they overlap each other as seen in the radial direction, and the bearing, the bearing support portion, the head portion of the fastening bolt, and the coil end portion are disposed in this order from the radially inner side.

8. The hybrid drive device according to any one of claim 1, wherein:
a thrust bearing is provided between the boss portion and a rotary member of the speed change device in the axial direction; and
the radially inner end surface of the intermediate wall includes a projecting surface portion that projects toward the speed change device, in the axial direction, with respect to a first axial surface which faces a side of the speed change device and which is a surface among axial end surfaces of the boss portion, and the thrust bearing abuts against the first axial surface in the axial direction and abuts against the projecting surface portion in the radial direction.

9. The hybrid drive device according to any one of claim 1, wherein:
the intermediate wall includes an intermediate wall oil passage that extends in the radial direction inside the intermediate wall and that opens in the radially inner end surface;
the intermediate support member includes a support member oil passage that extends in the radial direction inside the boss portion and that opens in an outer peripheral surface of the boss portion to be connected to the intermediate wall oil passage; and
working oil supplied from a hydraulic control device is supplied to the speed change device or the rotary electric machine via the intermediate wall oil passage and the support member oil passage.

10. The hybrid drive device according to any one of claim 1, wherein:
the rotary electric machine is a first rotary electric machine;
the hybrid drive device further includes a second rotary electric machine and a differential gear device that includes three rotary elements;
the input member, the second rotary electric machine, and the rotary shaft of the first rotary electric machine and the input shaft of the speed change device are coupled to different rotary elements of the differential gear device; and
the intermediate wall and the intermediate support member, the first rotary electric machine, the differential gear device, and the second rotary electric machine are disposed in this order from a side of the speed change device in the axial direction.

11. The hybrid drive device according to any one of claim 2, wherein:
a thrust bearing is provided between the boss portion and a rotary member of the speed change device in the axial direction; and
the radially inner end surface of the intermediate wall includes a projecting surface portion that projects toward the speed change device, in the axial direction, with respect to a first axial surface which faces side of the speed change device and which is a surface among axial end surfaces of the boss portion, and the thrust bearing abuts against the first axial surface in the axial direction and abuts against the projecting surface portion in the radial direction.

12. The hybrid drive device according to any one of claim 11, wherein:
- the intermediate wall includes an intermediate wall oil passage that extends in the radial direction inside the intermediate wall and that opens in the radially inner end surface;
- the intermediate support member includes a support member oil passage that extends in the radial direction inside the boss portion and that opens in an outer peripheral surface of the boss portion to be connected to the intermediate wall oil passage; and
- working oil supplied from a hydraulic control device is supplied to the speed change device or the rotary electric machine via the intermediate wall oil passage and the support member oil passage.

13. The hybrid drive device according to any one of claim 12, wherein:
- the rotary electric machine is a first rotary electric machine;
- the hybrid drive device further includes a second rotary electric machine and a differential gear device that includes three rotary elements;
- the input member, the second rotary electric machine, and the rotary shaft of the first rotary electric machine and the input shaft of the speed change device are coupled to different rotary elements of the differential gear device; and
- the intermediate wall and the intermediate support member, the first rotary electric machine, the differential gear device, and the second rotary electric machine are disposed in this order from a side of the speed change device in the axial direction.

14. The hybrid drive device according to any one of claim 11, wherein:
- the rotary electric machine is a first rotary electric machine;
- the hybrid drive device further includes a second rotary electric machine and a differential gear device that includes three rotary elements;
- the input member, the second rotary electric machine, and the rotary shaft of the first rotary electric machine and the input shaft of the speed change device are coupled to different rotary elements of the differential gear device; and
- the intermediate wall and the intermediate support member, the first rotary electric machine, the differential gear device, and the second rotary electric machine are disposed in this order from a side of the speed change device in the axial direction.

15. The hybrid drive device according to any one of claim 2, wherein:
- the intermediate wall includes an intermediate wall oil passage that extends in the radial direction inside the intermediate wall and that opens in the radially inner end surface;
- the intermediate support member includes a support member oil passage that extends in the radial direction inside the boss portion and that opens in an outer peripheral surface of the boss portion to be connected to the intermediate wall oil passage; and
- working oil supplied from a hydraulic control device is supplied to the speed change device or the rotary electric machine via the intermediate wall oil passage and the support member oil passage.

16. The hybrid drive device according to any one of claim 15, wherein:
- the rotary electric machine is a first rotary electric machine;
- the hybrid drive device further includes a second rotary electric machine and a differential gear device that includes three rotary elements;
- the input member, the second rotary electric machine, and the rotary shaft of the first rotary electric machine and the input shaft of the speed change device are coupled to different rotary elements of the differential gear device; and
- the intermediate wall and the intermediate support member, the first rotary electric machine, the differential gear device, and the second rotary electric machine are disposed in this order from a side of the speed change device in the axial direction.

17. The hybrid drive device according to any one of claim 2, wherein:
- the rotary electric machine is a first rotary electric machine;
- the hybrid drive device further includes a second rotary electric machine and a differential gear device that includes three rotary elements;
- the input member, the second rotary electric machine, and the rotary shaft of the first rotary electric machine and the input shaft of the speed change device are coupled to different rotary elements of the differential gear device; and
- the intermediate wall and the intermediate support member, the first rotary electric machine, the differential gear device, and the second rotary electric machine are disposed in this order from a side of the speed change device in the axial direction.

18. The hybrid drive device according to any one of claim 7, wherein:
- a thrust bearing is provided between the boss portion and a rotary member of the speed change device in the axial direction; and
- the radially inner end surface of the intermediate wall includes a projecting surface portion that projects toward the speed change device, in the axial direction, with respect to a first axial surface which faces a side of the speed change device and which is a surface among axial end surfaces of the boss portion, and the thrust bearing abuts against the first axial surface in the axial direction and abuts against the projecting surface portion in the radial direction.

19. The hybrid drive device according to any one of claim 7, wherein:
- the intermediate wall includes an intermediate wall oil passage that extends in the radial direction inside the intermediate wall and that opens in the radially inner end surface;
- the intermediate support member includes a support member oil passage that extends in the radial direction inside the boss portion and that opens in an outer peripheral surface of the boss portion to be connected to the intermediate wall oil passage; and
- working oil supplied from a hydraulic control device is supplied to the speed change device or the rotary electric machine via the intermediate wall oil passage and the support member oil passage.

20. The hybrid drive device according to any one of claim 7, wherein:
- the rotary electric machine is a first rotary electric machine;

the hybrid drive device further includes a second rotary electric machine and a differential gear device that includes three rotary elements;

the input member, the second rotary electric machine, and the rotary shaft of the first rotary electric machine and the input shaft of the speed change device are coupled to different rotary elements of the differential gear device; and the intermediate wall and the intermediate support member, the first rotary electric machine, the differential gear device, and the second rotary electric machine are disposed in this order from a side of the speed change device in the axial direction.

\* \* \* \* \*